Oct. 16, 1962 S. D. PIETERS 3,058,245
LUMINOUS ADVERTISING AND DISPLAY MEANS
Filed Jan. 21, 1960 2 Sheets-Sheet 1

INVENTOR.
SERVAAS DANIEL PIETERS
BY
*[signature]*
attorney

Oct. 16, 1962     S. D. PIETERS     3,058,245
LUMINOUS ADVERTISING AND DISPLAY MEANS
Filed Jan. 21, 1960     2 Sheets-Sheet 2
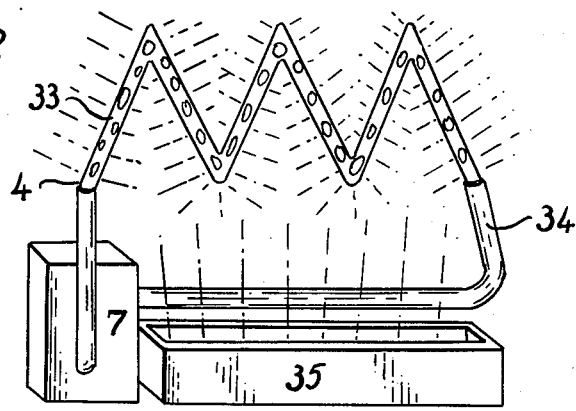
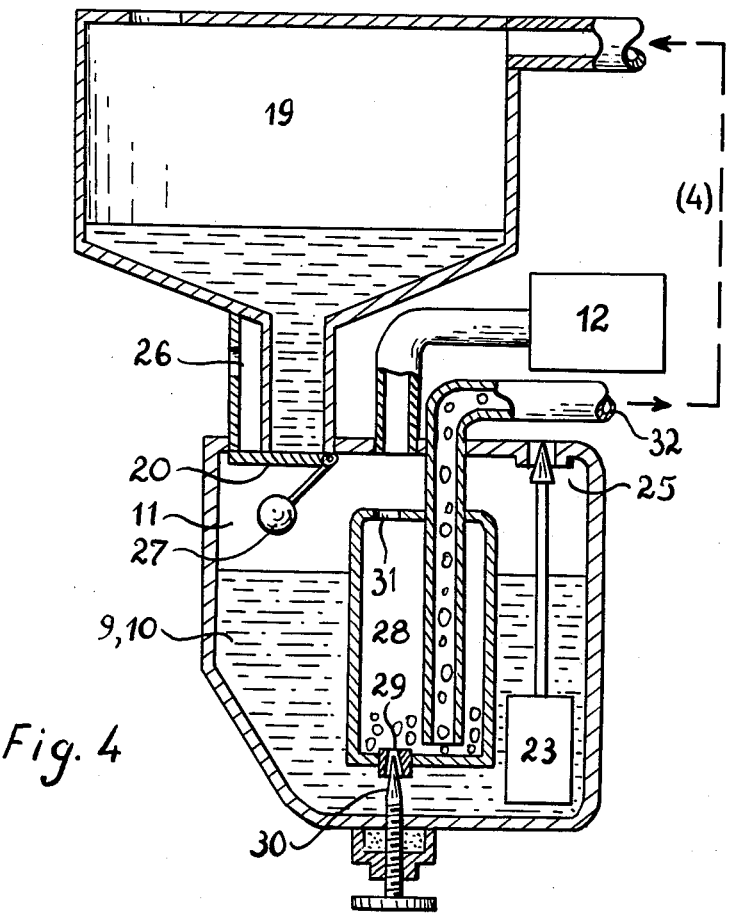
INVENTOR.
SERVAAS DANIEL PIETERS
BY 3,058,245
LUMINOUS ADVERTISING AND DISPLAY MEANS
Servaas Daniel Pieters, 297 van Heerden St., Capital Park, Pretoria, Transvaal, Union of South Africa
Filed Jan. 21, 1960, Ser. No. 3,788
Claims priority, application Union of South Africa Jan. 28, 1959
5 Claims. (Cl. 40—106.21)

The present invention relates to advertising means, more particularly illuminated signs.

Illuminated signs of various kinds have been known for many years, the most important of these being the so-called neon signs. These require expensive equipment and very high tensions for their operation. If it is desired to produce an effect of movement with such equipment, the expenses increase considerably. Furthermore, many types of illuminated or luminous signs are known to interfere with radio reception.

It is an object of the present invention to provide a new or improved illuminated or luminous sign, which does not have the above-mentioned disadvantages, which can be produced at relatively low cost and which is nevertheless very effective and easy to maintain.

An illuminated or luminous sign in accordance with the invention comprises transparent or translucent conduits for liquid in the form of lettering, designs, outlines of pictures or whatever constitutes the subject of the advertisement or other sign or part thereof, filled or partly filled with a suitable liquid and which lettering, designs or the like are illuminated or caused to luminate by suitable radiation, and further comprises means for causing the liquid to flow through the said conduits, thus producing a flowing effect. The said conduits may be tubular or may be of any other suitable configuration. They may be made of glass, plastic, e.g. polymethyl-methacrylate or any other suitable non-opaque material.

The radiation may come from a source of visible light situated behind the lettering or the like with respect to the viewer. In this case it is often desirable to use a coloured liquid as the filling of the conduits. The conduits themselves may also be made of coloured glass or the like.

If a source of "white" light is used, the light may, if desired, be passed through a coloured filtering medium, which may be stationary or of a type which changes colour, inserted between the sources and the conduits. Alternatively, a source of coloured light may be employed.

The features of the preceding two paragraphs may be combined to give a very favourable effect.

Preferably a screen is provided just behind the conduits, which may for example be opaque or relatively weakly translucent except for those portions of its area, which to the front are covered by the conduits. This serves to produce a well-defined contrast between the illuminated conduits and the background.

The said screen may be made of a transparent or translucent material, e.g. glass or polymethyl-methacrylate or the like, which is coated with an opaque or weakly translucent substance, except for the portions specified.

Alternatively the screen may be made of an opaque material, e.g. sheet metal, wood or hardboard, or a weakly translucent material, apertures being cut out therefrom to provide the transparent portions. The apertures may be glazed with coloured panes of glass, or covered with plastic or the like.

The enclosed portions of such letters as O's etc. may be filled in with a suitable opaque material, e.g. cut-out pieces of cork sheet suitably glued into position.

To enhance the flowing effect, the filling of the conduits with any particular liquid is preferably non-continuous. According to one embodiment a train of bubbles is interspersed between moving sections of liquid in the conduits.

According to another embodiment the column of the said liquid passing through the conduits is interrupted at relatively longer intervals, the beginning and end of such a column of liquid passing through the conduits being conspicuous by a sudden change in colour or light intensity. The uninterrupted liquid column may be sufficiently long to completely fill the conduits for a certain period of time before the tail end of the column becomes visible in the non-opaque, illuminated conduit system. A scribing effect may be obtained in this manner.

Preferably, however, the two effects described in the preceding two paragraphs are combined.

It is furthermore possible to successively pass two or more liquids of different colours, immiscibly in one another, through the conduits, e.g. solutions of dyes which are insoluble in the other solution.

One of the liquids may, for example, be substantially opaque.

If letters or the like of great thickness are to be incorporated in the sign, these may be made up of a number of parallel conduits.

The source of light may be one or more filament type electric globes, so-called fluorescent tubes or any other suitable source of illumination. Preferably, reflectors are provided for a more economic utilisation of the light, unless one source of light serves to illuminate lettering or the like provided on two or more sides of the source of light.

The liquid in the conduits may be water to which a suitable substance may be added to alter the surface tension if required. Any suitable water-soluble or water-suspendable dye may be used to impart colour if desired. The invention is not limited to the use of aqueous media.

It is also possible to employ a fluorescent liquid medium, e.g. a solution of one of the many fluorescent organic substances and irradiate the conduits with a source of ultraviolet light. In this case the source of radiation, e.g. one of the many types of lamps, which are known in the trade for such purposes, is preferably situated in front of and below the tubes. A screen, preferably with a reflecting inner surface should definitely be used to prevent harmful ultra-violet radiation from reaching the eye of the viewer.

If it is desired to provide a train of bubbles passing through the conduits, a device is used, which pumps the desired proportions of gas and liquid through the conduit system. The liquid portion is preferably recycled. In a preferred embodiment, the pumping is effected by an air pump, e.g., a small compressor. The pressure of the pump is used to force the gas, preferably air, through the conduits and at the same time also force a suitable proportion of liquid from a storage container through the tubes, the liquid later being recycled to the storage container.

Generally speaking a device in accordance with the invention for producing the desired mixture of gas bubbles and liquid comprises a liquid storage container which is partly filled with liquid, the gas space above the liquid level being kept at a suitable pressure by a pump or other suitable source of pressure and a mixing space which is in communication, both with the liquid in the storage container and with the said gas space through apertures or passages the dimensions of which determine the amounts of liquid and gas bubbles to be mixed, and which mixing space discharges into the illuminated or luminous conduits of the advertising means.

Normally the device furthermore comprises a collecting vessel at a level above the storage container for collecting the liquid after its passage through the conduits, the bottom of the collecting vessel being in communication with the air space of the storage vessel, a stop valve being provided, which is normally kept closed by the pressure in the air space, but which allows the liquid in the collection vessel to flow back into the storage container as soon as the pressure in the air space is released. For this purpose a valve is provided in the top of the storage vessel, which automatically releases the pressure as soon as the liquid level in the storage container has dropped beyond a certain limit. The said valve is operated by a float.

With this embodiment of the invention, the flow of the train of bubbles will momentarily stop for the short period, during which the liquid flows from the collecting vessel to the storage container, but this does not detract from the pleasing appearance of the sign.

If desired, the amount of liquid entering the mixing space through the aperture or the like may be adjusted by means of a needle valve, stop cock or like control.

Similarly, a stop cock, needle valve or other suitable regulating valve device may be provided for independently adjusting the rate at which the air or other gas is admitted to the mixing space.

In its simplest form the mixing space is represented by the locality of confluence of a pipe leading from the bottom of the storage container and a second normally thinner pipe which leads from the said gas space. Either or both of these pipes may be provided with the above-mentioned regulating valve devices.

It is, however, also possible to provide a well defined mixing vessel as the mixing space. This mixing vessel may also be provided inside the said storage container. The principle is the same. Also in this case the mixing vessel, normally the top of the mixing vessel, communicates with the gas space, and the lower portion of the mixing vessel is provided with a relatively small aperture or narrow tube or the like below the surface level of the liquid in the storage container, by means of which aperture or the like the mixing vessel is also in communication with the liquid in the storage tank, the aperture or the like being so dimensioned or adjustable that the correct amount of liquid flows into the mixing vessel to give the desired proportions of gas to liquid, which is forced by the air pressure into a tube at the bottom of the mixing vessel and from this tube through the illuminated or luminous conduits of the sign.

The valve which closes the bottom of the collecting vessel may be spring-loaded so as to return to the closed position after the liquid from the collecting vessel has been returned to the storage vessel. Normally, however, a float in the storage vessel is connected to the valve which float closes the valve once the full liquid level in the storage vessel has been restored.

In the preferred embodiment an additional gas vent is provided which is also controlled by the valve controlling the flow of liquid from the collecting to the storage vessel and which vent permits the rapid escape of the gas displaced by the liquid flowing from the collecting to the storage vessel when the valve is open.

According to another embodiment of the invention, a double gear pump is used to pump a limited supply of liquid from a reservoir through the conduits. As soon as the supply of the particular liquid is exhausted any other medium available in the reservoir will be drawn into the conduits to follow up the column of the said liquid. Such other medium may, for example, be air. However, the invention is not limited to the use of air. The liquid is preferably finally recirculated to the first-mentioned liquid reservoir.

Again, the invention is not limited to the use of a double gear pump. Any other suitable device or combination of devices may be employed. For example, a limited supply of liquid may be displaced from a reservoir into the conduit system by means of a pressure-difference set up between the said reservoir and a second reservoir set up at the opposite end of the conduit system, e.g. by the action of a compressor at the first reservoir or a suction pump at the second reservoir, suitable valves and/or other means being provided to allow the liquid to return from the second to the first reservoir after the liquid and a desired amount of air have passed through the conduits.

The invention and the manner in which it may be put into practice will be further described by way of example with reference to the accompanying drawings, in which FIG. 1 represents a diagrammatic perspective view of an illuminated sign in accordance with the invention.

FIG. 2 represents a perspective view of a modified form of a sign in accordance with the invention.

FIG. 4 represents a similar view to that shown in FIG. 3 of an alternative apparatus for producing the said mixed stream of liquid and gas bubbles.

Figure 1:
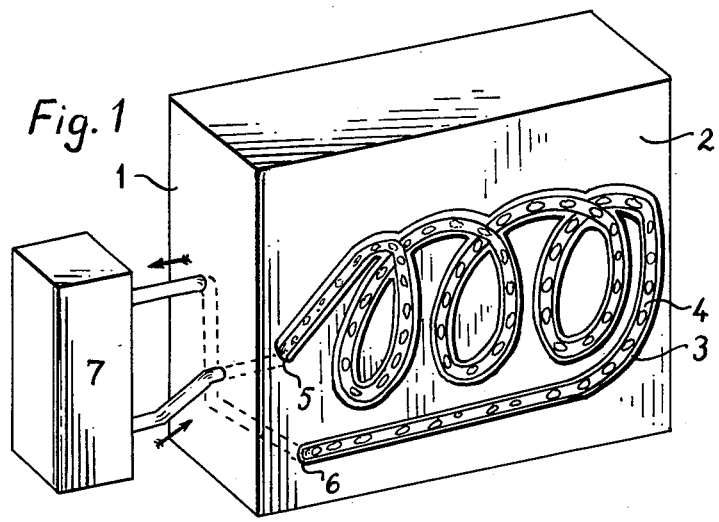

Referring to FIG. 1 of the drawings, the sign is made up of a box-like casing 1 comprising a front panel 2 which is opaque or relatively weakly translucent except for the parts 3 which are largely covered by the glass or transparent plastic tubes 4. The latter form a continuous conduit, becoming visible from the outside of the panel 2 at 5 and again disappearing at 6 inside the casing. Both ends of the conduit lead to a circulating device 7 shown in this case outside the casing 1, although it could also be accommodated inside the casing 1. It should also be understood that any number of sides of the casing may be constituted in the manner of panel 2.

Inside the casing 1 one or more light sources are provided, e.g. ordinary electric globes, fluorescent tubes or the like. The tubes 4, which may also be integral with the panel 2, are thereby illuminated from behind, whereas the opaque or weakly translucent parts of the panel form a darker background. The panel may, for example, be made of glass or translucent plastic sheeting onto which a suitable coating, e.g. paint, is applied over those parts which constitute the background.

The circulating device circulates a fluid or fluids through the tubes 4 in the manner or manners specified in the general description and which will be elucidated in detail below. The object is to produce a flowing effect. This effect may, for example, be enhanced by dispersing a glittering substance, e.g. gold flakes, fine metal dust or the like in a liquid being pumped through the tubes. Alternatively two or more different fluids, e.g. liquids of different colour, insoluble in one another are successively pumped through the tubes, e.g. water and paraffin oil or kerosene, or water and carbon tetrachloride, each containing a dye or at least one containing a dye which is insoluble in the other liquid. One liquid may even be so strongly dyed that it becomes virtually opaque. A striking scribing effect may thus be attained. A similar effect is attained by following up a column of liquid passing through the tubes by a column of gas, e.g. air or vice versa.

For the first-mentioned effects the system 3, 7 is completely filled with the liquid or liquids and the circulating device 7 may be any known form of circulating pump.

For the last-mentioned effect, the system 3, 7 is partly filled with liquid or liquids and partly filled with gas, e.g. air. The circulating device 7 must then comprise a type of circulating pump which can stand up to periodical dry running. Certain double gear pumps were found suitable for the purpose.

A further effect which can be used as such or which may be superimposed on the effects described above comprises the inclusion of a stream of gas bubbles in the liquid stream. For this purpose use may be made of the devices shown in FIGS. 3 or 4 which both work on the same principle, and which take the place of the circulating devices 7 mentioned above.

Figure 3:
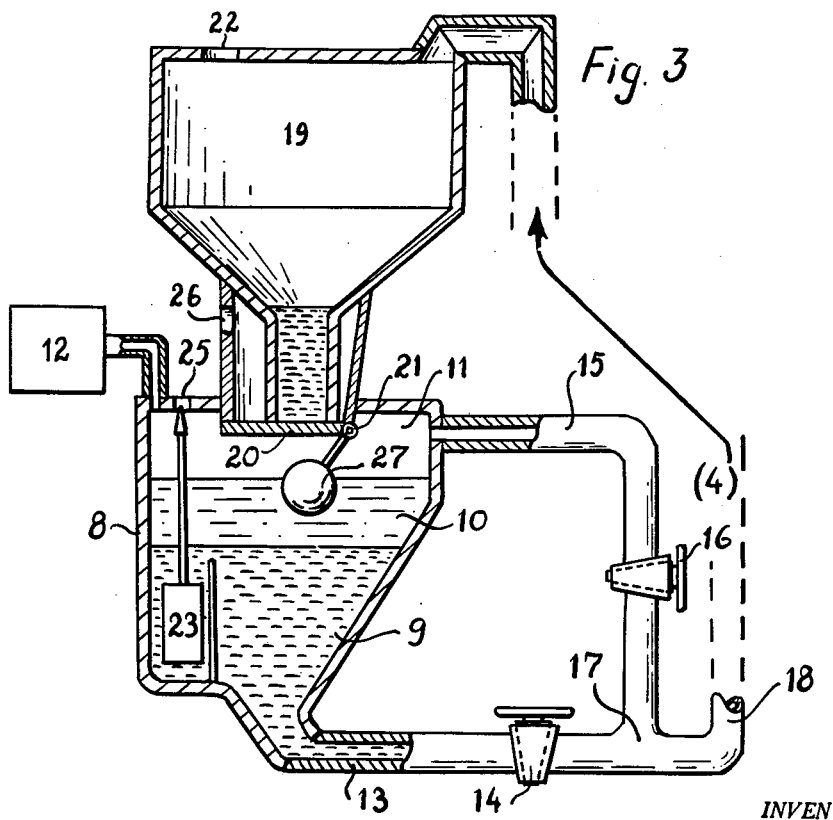
FIG. 3 represents a section through an apparatus for producing a mixed stream of liquid and gas bubbles.

In FIG. 3 a storage container 8 is shown, partly filled with two immiscible liquids 9 and 10, e.g. water (9) and paraffin oil (kerosine) (10), each dyed a different colour.

Above the liquids there is an air space 11 to which compressed air is fed by a small compressor 12. The pressure forces the liquid through pipe 13 at a rate which can be controlled by an optional stop cock or valve 14. Simultaneously a stream of air is forced through a small bore pipe 15 at a rate which can be controlled by stop cock or equivalent 16. The two streams meet in mixing space 17, in this example simply the point of confluence of the two pipes. A mixture of liquid and gas bubbles then passes through pipe 18 to the tubes 4 of the sign.

After having passed through the tubes 4, the liquid is collected in the collecting vessel 19, the neck of which terminates in storage vessel 8. As long as there is pressure in air space 11, the valve 20, hinged to the neck at 21 is kept closed. No pressure can be built up in vessel 19, since the air bubbles can escape through vent 22.

As soon as the level of liquid in vessel 8 has dropped sufficiently, the float 23, laterally supported by float guide 24 drops and causes the opening of valve 25. The resulting pressure drop in the storage vessel causes the opening of valve 20 and the transfer of the liquid from collecting vessel 19 to storage vessel 8. The air displaced by the liquid can escape through vent 26, even after valve 25 has again been closed by the rising liquid level in vessel 8. Finally, the liquid level has also risen sufficiently to cause the closing of valve 20 by means of float 27. The float 27 can also be replaced by a spring which is just strong enough to close the valve if there is no liquid left in collecting vessel 19. Immediately after valve 20 has been closed again, the air pressure in space 11 rises and keeps the valve 20 closed throughout the next operating cycle which is a mere repetition of the cycle just described.

Referring now to FIG. 4, the arrangement is similar to that in accordance with FIG. 3, and like parts are referred to by like numbers.

The main difference is, that the mixing of air and liquid takes place in a mixing vessel 28. The liquid enters the mixing vessel through a small opening 29 at the bottom of the vessel at a rate which can be controlled by needle valve 30. Air under pressure is admitted through aperture 31. Liquid mixed with air then bubbles through pipe 32 to tubes 4. In all other respects the operation follows the same cycle as in the previous example.

Referring finally to FIG. 2, the feed tubes and outlet tubes 33 and 34 are made of opaque material. A liquid containing a strongly fluorescent substance is circulated through the system (7, 33, 4, 34). Instead of being illuminated from behind, the tube 4 is irradiated with ultraviolet light emitted by U.V. lamps in reflector 35 which is set up in such a manner that the viewer cannot be injured by direct U.V. radiation. The ultra-violet light causes the liquid in the tube 4 to fluoresce.

I claim:

1. Luminous advertising and display means of the type which comprise non-opaque conduits for liquid arranged in the form of at least part of the subject of display, the conduits being at least partly filled with a suitable liquid, and which non-opaque conduits are rendered luminous by suitable irradiation, comprising the feature that a circulating device is provided for circulating desired proportions of gas and liquid through the conduit system in the form of a train of bubbles interspersed between moving sections of liquid, and which circulating device comprises a liquid storage container, which is partly filled with liquid, a gas space above the liquid level being kept at a pressure suitable for the forcing of the liquid through the display conduits by a source of pressure and a mixing space which is in communication, both with the liquid in the storage container and with the said gas space through passages, the dimensions of which determine the amounts of liquid and gas bubbles to be mixed, and which mixing space discharges into the luminous conduits of the advertising and display means to which it is connected, and which furthermore comprises a collecting vessel at a level above the storage container for collecting the liquid after its passage through the conduits, the top of the collecting vessel being provided with an air vent which allows the escape of the gas bubbles, the bottom of the collecting vessel being in communication with the air space of the storage vessel, a stop valve being provided, which is kept closed by the pressure in the air space during the circulation of the liquid having gas dispersed therein through the conduits, but which allows the liquid in the collection vessel to flow back into the storage container as soon as the pressure in the air space is released and in which a valve is provided in the top of the storage vessel, which automatically releases the pressure as soon as the liquid level in the storage container has dropped beyond a certain limit, thereby releasing the pressure in the gas space above the liquid and thus effecting the opening of the first mentioned stop valve, so that the liquid in the collecting vessel flows back into the storage container once more, both the abovementioned valves being such that after the collecting vessel has been emptied they both close automatically.

2. Luminous advertising and display means as claimed in claim 1 in which only the gas is pumped by means of which gas the mixture of liquid and gas is circulated through the conduits.

3. Luminous advertising and display means as claimed in claim 1 in which the stop valve which closes the bottom of the collecting vessel is spring-loaded so as to return to the closed position after the liquid from the collecting vessel has been returned to the storage vessel.

4. Luminous advertising and display means as claimed in claim 1 in which a float in the storage vessel is connected to the stop valve which closes the bottom of the collecting vessel, which float closes the valve once the full liquid level in the storage vessel has been restored.

5. Luminous advertising and display means as claimed in claim 1, which further comprises means for independently directly adjusting the relative influx of gas into the mixing space.

References Cited in the file of this patent

UNITED STATES PATENTS

| | | |
|---|---|---|
| 1,979,336 | Martin et al. | Nov. 6, 1934 |
| 2,099,155 | Weber et al. | Nov. 16, 1937 |
| 2,621,430 | Neville | Dec. 16, 1952 |

FOREIGN PATENTS

| | | |
|---|---|---|
| 297,177 | Great Britain | Sept. 20, 1928 |
| 20,589 | Australia | Dec. 15, 1934 |